(12) United States Patent
Katabi et al.

(10) Patent No.: US 9,958,529 B2
(45) Date of Patent: May 1, 2018

(54) RADIO FREQUENCY LOCALIZATION

(71) Applicant: Massachusetts Institute of Technology, Cambridge, MA (US)

(72) Inventors: Dina Katabi, Cambridge, MA (US); Deepak Vasisht, Cambridge, MA (US); Jue Wang, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 358 days.

(21) Appl. No.: 14/683,516

(22) Filed: Apr. 10, 2015

(65) Prior Publication Data
US 2015/0293647 A1    Oct. 15, 2015

Related U.S. Application Data

(60) Provisional application No. 61/978,160, filed on Apr. 10, 2014.

(51) Int. Cl.
| | | |
|---|---|---|
| H04W 24/00 | (2009.01) |
| G01S 5/00 | (2006.01) |
| G01S 5/06 | (2006.01) |
| G01S 5/02 | (2010.01) |
| G01S 5/04 | (2006.01) |
| G01S 5/12 | (2006.01) |
| G06F 3/043 | (2006.01) |

(52) U.S. Cl.
CPC .......... *G01S 5/0036* (2013.01); *G01S 5/0294* (2013.01); *G01S 5/04* (2013.01); *G01S 5/06* (2013.01); *G01S 5/12* (2013.01); *G06F 3/0433* (2013.01); *G06F 2203/04101* (2013.01)

(58) Field of Classification Search
CPC ........ H04W 64/00; H04W 4/02; H04W 48/04
See application file for complete search history.

(56) References Cited

U.S. PATENT DOCUMENTS

| | | | |
|---|---|---|---|
| 5,513,854 A | 5/1996 | Daver | |
| 5,848,063 A * | 12/1998 | Weaver, Jr. ........... | H04W 36/30 370/331 |
| 5,977,958 A | 11/1999 | Baron et al. | |
| 6,125,278 A * | 9/2000 | Wieczorek ............ | H04W 28/26 455/437 |
| 6,147,678 A | 11/2000 | Kumar et al. | |

(Continued)

FOREIGN PATENT DOCUMENTS

| | | |
|---|---|---|
| EP | 0252807 | 1/1988 |
| EP | 0241992 | 4/1989 |

(Continued)

*Primary Examiner* — Steve D'Agosta
(74) *Attorney, Agent, or Firm* — Occhiuti & Rohlicek LLP

(57) ABSTRACT

A system for localization of a radio frequency source in a region includes a first plurality of antennas disposed about the region, a second plurality of antennas disposed about the region, a first radio frequency positioning module in communication with the first plurality of antennas and configured to determine a plurality of spatially separated candidate locations in the region for the radio frequency source, a second radio frequency positioning module in communication with the second plurality of antennas and configured to determine a sub-region of the region, the sub-region including the radio frequency source, and a resolution module for identifying a subset of the candidate locations in the sub-region of the region.

13 Claims, 6 Drawing Sheets

(56) References Cited

U.S. PATENT DOCUMENTS

| | | | |
|---|---|---|---|
| 6,204,813 B1 | 3/2001 | Wadell et al. | |
| 6,452,585 B1 | 9/2002 | Horton et al. | |
| 6,747,599 B2 | 6/2004 | McEwan | |
| 7,009,561 B2 | 3/2006 | Menache et al. | |
| 7,057,604 B2 | 6/2006 | Bajramovic | |
| 7,227,526 B2 | 6/2007 | Hildreth et al. | |
| 8,098,155 B2 * | 1/2012 | Gloo | G01S 5/04 340/539.11 |
| 8,195,190 B1 * | 6/2012 | Hou | G01S 5/0263 455/432.2 |
| 8,648,805 B2 | 2/2014 | Bailen | |
| 2003/0122666 A1 | 7/2003 | John et al. | |
| 2003/0156756 A1 | 8/2003 | Gokturk et al. | |
| 2004/0193413 A1 | 9/2004 | Wilson et al. | |
| 2008/0130597 A1 * | 6/2008 | Kalhan | H04W 88/10 370/338 |
| 2010/0015990 A1 * | 1/2010 | Gallagher | H04W 60/02 455/456.1 |
| 2010/0130230 A1 * | 5/2010 | Aggarwal | G01S 5/0263 455/456.1 |
| 2010/0159949 A1 * | 6/2010 | Selgert | H04W 64/003 455/456.1 |
| 2010/0234094 A1 | 9/2010 | Gagner et al. | |
| 2011/0102262 A1 * | 5/2011 | Haskell | H01Q 1/246 342/372 |
| 2011/0105094 A1 * | 5/2011 | Hassan | H04N 7/163 455/418 |
| 2011/0294515 A1 * | 12/2011 | Chen | G01S 5/0252 455/456.1 |
| 2012/0092284 A1 | 4/2012 | Rofougaran et al. | |
| 2012/0162057 A1 | 6/2012 | Tan et al. | |
| 2012/0287090 A1 | 11/2012 | Cacioppo | |
| 2013/0057506 A1 | 3/2013 | Hu et al. | |
| 2013/0069917 A1 | 3/2013 | Wang et al. | |
| 2013/0095846 A1 * | 4/2013 | Brisebois | H04W 16/28 455/456.1 |
| 2013/0260798 A1 * | 10/2013 | Moshfeghi | H04W 4/025 455/456.5 |
| 2013/0278499 A1 | 10/2013 | Anderson | |

FOREIGN PATENT DOCUMENTS

| | | |
|---|---|---|
| EP | 0834748 | 4/1998 |
| EP | 2919031 | 9/2015 |

* cited by examiner

RADIO FREQUENCY LOCALIZATION

CROSS-REFERENCES TO RELATED APPLICATIONS

The application claims the benefit of U.S. Provisional Application Ser. No. 61/978,160, titled "Radio Frequency Localization," filed Apr. 10, 2014, the contents of which are incorporated herein by reference.

STATEMENT AS TO FEDERALLY SPONSORED RESEARCH

This invention was made with Government support under Contract No. FA8721-05-C-0002 awarded by the U.S. Air Force. The Government has certain rights in the invention.

BACKGROUND

This invention relates to localization of radio frequency sources. The invention also relates to a virtual touchscreen application for a radio frequency localization system.

Localization of Radio Frequency (RF) sources is an active area of research interest. The majority of RF source localization systems focus on the problem of discovering an exact location of an RF source.

Referring to FIG. 1, one example of such a localization system 100 includes two pairs of antennas, a first antenna pair 102 and a second antenna pair 104, and generally uses a triangulation approach. For each pair of antennas 102, 104, the individual antennas of the pair have a spacing which is less than or equal to $\lambda/2$ (where $\lambda$ is the wavelength). This constraint on the antenna spacing ensures that each of the antenna pairs 102, 104 forms only a single lobe in the antenna sensitivity pattern.

In the system 100 of FIG. 1, the antenna pairs 102, 104 are positioned such that a first lobe 106 formed by the first antenna pair 102 can be formed in a unique direction relative to a second lobe 108 formed by the second antenna pair 104. As an RF source 110 moves through an area in proximity to the antenna pairs 102, 104, the antenna pairs 102 sweep their respective lobes 106, 108 to track the location of the RF source 110.

The resolution of the location of the RF source 110 determined by the system 100 is dependent on a width of the lobes 106, 108. In particular, the location of the RF source 110 is only known to be within the area 112 where the two lobes 106, 108 intersect. In general, the location of the RF source 110 can be resolved to a location with a resolution in the tens of centimeters by the system 100. A standard approach for improving the location resolution of a system such as the system of FIG. 1 is to increase the number of antennas used in the system.

SUMMARY

Due to issues related to system cost and system complexity, it is not always practical to increase the number of antennas in an RF localization system to achieve a desired localization resolution. Thus, another approach is to leverage a tradeoff between resolution and unambiguity in the system.

In a general aspect, an RF positioning system employs a multi-resolution positioning technique that exploits an intrinsic tradeoff between improving a resolution in the location of an RF source and resolving an ambiguity in the location of the RF source. The RF positioning system can precisely determine a position of an RF source within less than 40 centimeters (e.g., 30 centimeters) and can precisely track a trajectory of the RF source within less than 10 centimeters (e.g., 3.7 centimeters).

In some situations (e.g., gesture-based user interfaces), it may be more important to obtain a detailed trajectory of an RF source rather than its exact location. In such applications, an accuracy in the tens of centimeters is unacceptable.

In another general aspect, an RF trajectory tracing system employs a multi-resolution positioning technique that exploits an intrinsic tradeoff between improving a resolution in the location of an RF source and resolving an ambiguity in the location of the RF source. The RF trajectory tracing system can precisely reconstruct small details in a trajectory shape of a movement of the RF source, even when an absolute portion of the RF source may be ambiguous.

In another general aspect, a system for localization of a radio frequency source in a region includes a first plurality of antennas disposed about the region, a second plurality of antennas disposed about the region. A first radio frequency positioning module is in communication with the first plurality of antennas and is configured to determine a plurality of spatially separated candidate locations in the region for the radio frequency source. A second radio frequency positioning module is in communication with the second plurality of antennas and is configured to determine a sub-region of the region, the sub-region including the radio frequency source. A resolution module identifies a subset of the candidate locations in the sub-region of the region.

Aspects may include one or more of the following features.

The resolution module may be configured to determine an actual location of the radio frequency source in the region from the identified subset of the candidate locations in the sub-region of the region.

The system may include a tracking module for accepting time successive candidate locations from the resolution module and determining a trajectory of the radio frequency source based on the time successive candidate locations.

The plurality of spatially separated candidate locations may be spatially disjoint. The plurality of spatially separated candidate locations may be spatially distributed. The sub-region of the region may be spatially distributed.

The resolution module is may be configured to apply a voting algorithm to the spatially separated candidate locations to determine the actual location of the radio frequency source. The first plurality of antennas may include two or more pairs of antennas, the antennas of each of the two or more pairs of antennas being separated by a distance of greater than one half of a wavelength of a radio frequency signal emitted from the radio frequency source. A receiving antenna pattern of each of the two or more pairs of antennas may include a number of lobes.

Each spatially separated candidate location of the plurality of spatially separated candidate locations may be located at an intersection of lobes from two or more of the two or more pairs of antennas. The first radio frequency positioning module may be configured to sweep the receiving antenna pattern of each of the two or more pairs of antennas such that one of the lobes of the antenna pattern of the pair of antennas tracks a position of the radio frequency source.

The second plurality of antennas may includes two or more pairs of antennas, the antennas of each of the two or more pairs of antennas being separated by a distance of less than or equal to one half of a wavelength of a radio frequency signal emitted from the radio frequency source. A receiving antenna pattern of each of the two or more pairs of antennas may include a main lobe and a plurality of side lobes, a sensitivity of the main lobe being greater than a sensitivity of any one of the side lobes. The second radio frequency positioning module may be configured to sweep the receiving antenna pattern of each of the two or more pairs of antennas such that the main lobe of the antenna pattern pair of antennas tracks a position of the radio frequency source. The first plurality of antennas may be distinct from the second plurality of antennas.

One or more of the first radio frequency positioning module, the second radio frequency positioning module, and the resolution module are implemented in a software controlled processor.

Aspects may use RFID tags as the radio frequency source. Aspects may be capable of identifying and tracking a position of two or more radio frequency sources. A motion of the radio frequency source may be used to refine an estimated position of the radio frequency source. Aspects may be able to function in the presence of multipath effects. Other radio frequency sources such as devices communicating using Bluetooth, WiFi, Zigbee, and so on may also be used by the approaches describe above.

The various antennas of the system may all be disposed on a single device or may be disposed on multiple distinct devices. Aspects may also employ cameras, infrared sensors, and so on to improve tracking capabilities. Aspects may employ smooth phase unwrapping techniques. Aspects may employ filtering techniques to eliminate or mitigate errors due to effects such as human motion.

Phase measurement errors in signals detected at individual antennas may be eliminated or mitigated by using the signals detected at the other antennas. Aspects may be used in virtual reality systems. Aspects may be used to trace other parts of a user's body, including the user's entire body. Aspects may be used to track objects other than the human body.

In another general aspect, a method for two-dimensional and three-dimensional positioning and trajectory tacking of a radio frequency source in a region to enable a virtual touch screen in the air using radio frequency signals. The method includes, determining, at a first radio frequency positioning module, a plurality of spatially separated candidate locations in the region for the radio frequency source based on signals received from a first plurality of antennas. The method also includes determining, at a second radio frequency positioning module, a sub-region of the region based on signals received from a second plurality of antennas, the sub-region including the radio frequency source. The method also includes identifying, at a resolution module, a subset of the candidate locations in the sub-region of the region. The method also includes tracking, using a tracking module, time successive candidate locations from the resolution module and determining a trajectory of the radio frequency source based on the time successive candidate locations. The method also includes recognizing, using a gesture recognition module, gestures represented in the determined trajectory of the radio frequency source.

Aspects may include one or more of the following features.

The gestures may include representations of letters, numbers, or other symbols or drawings (e.g., a music note). Determining the plurality of spatially separated candidate locations may include utilizing knowledge of a placement of antennas of the first plurality of antennas and utilizing measured phases of the signals received from the first plurality of antennas, and determining the sub-region of the region may include utilizing knowledge of a placement of antennas of the second plurality of antennas and utilizing measured phases of the signals received from the second plurality of antennas.

The gesture recognition module may include a handwriting recognition module. The method may further include providing the recognized gestures as input to a computing system. The computing system may include a video gaming system. The computing system may include an appliance control system. The computing system may include a general purpose computer.

In another general aspect, a system for two-dimensional and three-dimensional positioning and trajectory tacking of a radio frequency source in a region to enable a virtual touch screen in the air using radio frequency signals. The system includes a first plurality of antennas disposed about the region and a second plurality of antennas disposed about the region. The system includes a first radio frequency positioning module for determining a plurality of spatially separated candidate locations in the region for the radio frequency source based on signals received from the first plurality of antennas. The system includes a second radio frequency positioning module for determining a sub-region of the region based on signals received from the second plurality of antennas, the sub-region including the radio frequency source. The system also includes a resolution module for identifying a subset of the candidate locations in the sub-region of the region. The system also includes a tracking module for tracking time successive candidate locations from the resolution module and determining a trajectory of the radio frequency source based on the time successive candidate locations. The system also includes a gesture recognition module for recognizing gestures represented in the determined trajectory of the radio frequency source.

Aspects may include one or more of the following features.

The gestures may include representations of letters, numbers, or other symbols or drawings (e.g., a music note), The first radio frequency positioning module may determine the plurality of spatially separated candidate locations including utilizing knowledge of a placement of antennas of the first plurality of antennas and utilizing measured phases of the signals received from the first plurality of antennas, and the second radio frequency positioning module may determine the sub-region of the region including utilizing knowledge of a placement of antennas of the second plurality of antennas and utilizing measured phases of the signals received from the second plurality of antennas.

Aspects may have one or more of the following advantages.

Among other advantages use of a multi-resolution positioning system enables highly accurate localization of an RF source without the need for very large number of antennas.

The multi-resolution positioning system can determine a very fine grained position of an RF source, thereby enabling the use of the system to accurately track a trajectory of the RF source as it moves.

The multi-resolution positioning system can be used to provide input to remote devices or to devices which do not have input devices such as keyboards and mice.

The multi-resolution positioning system does not require line of sight to function.

The grating lobes which the multi-resolution positioning system are highly robust to noise, thereby increasing the robustness the system as a whole to noise.

DESCRIPTION

1 Multi-Resolution Positioning

Figure 1:
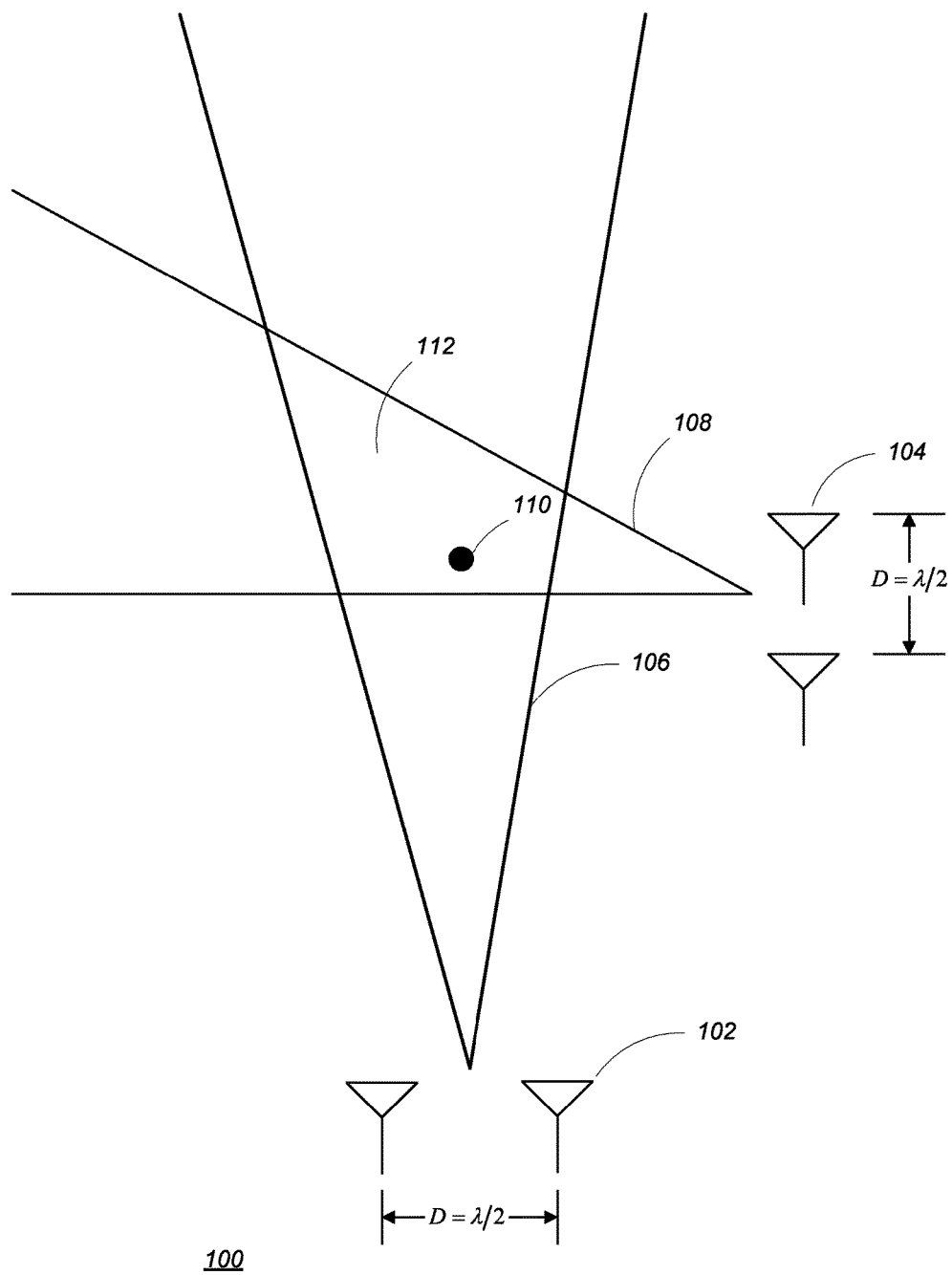
FIG. 1 is a schematic diagram of a conventional radio frequency localization system.
Figure 2:
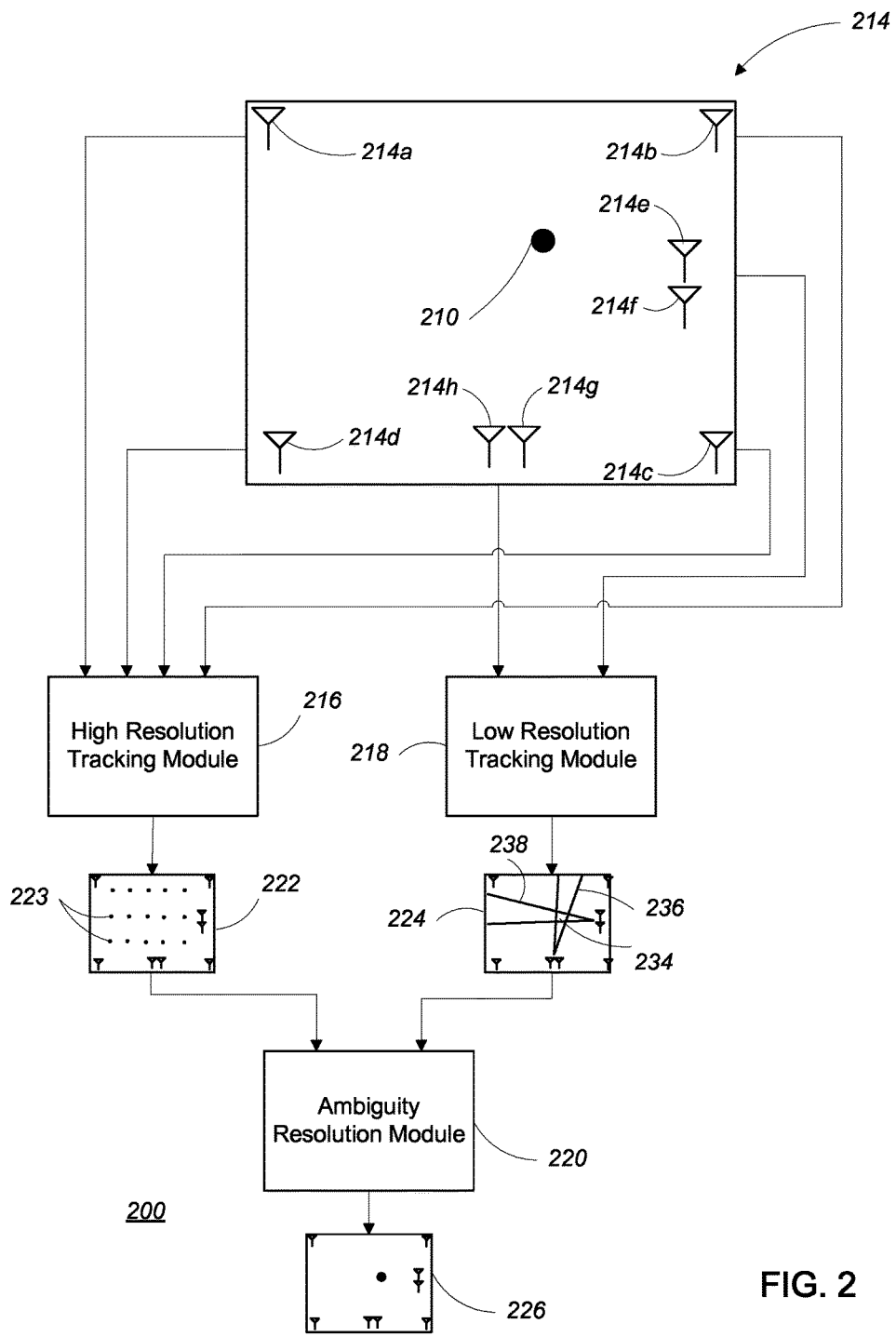
FIG. 2 is a schematic diagram of a multi-resolution radio frequency localization system.

Referring to FIG. 2, a multi-resolution positioning system 200 includes a plurality of antennas 214, a high resolution tracking module 216, a low resolution tracking module 218, and an ambiguity resolution module 220. As is described in greater detail below, the antennas 214 are arranged such that some of the antennas are used by the high resolution tracking module 216 to track a fine-grained but ambiguous location 222 of an RF source 210 while other of the antennas 214 are used by the low resolution tracking module 218 to track a coarse-grained and unambiguous location 224 of the RF source 210. The ambiguity resolution module 220 processes the output of the high resolution tracking module 216 and the output of the low resolution tracking module 218 to generate a fine-grained and unambiguous location 226 of the RF source 210.

1.1 Principle of Operation

Before describing an exemplary operation of the system of FIG. 2, FIGS. 3-5 provide a brief description of the principle of operation of the system.

In RF-based positioning, the Angle of Arrival (AoA) of an RF source is typically computed by comparing the phases of the received signals at multiple antennas. In some examples, the AoA is determined using a widely known principle that the phase of an RF signal rotates by $2\pi$ radians for every $\lambda$ distance that the signal travels, where $\lambda$ is the wavelength.

Figure 3:
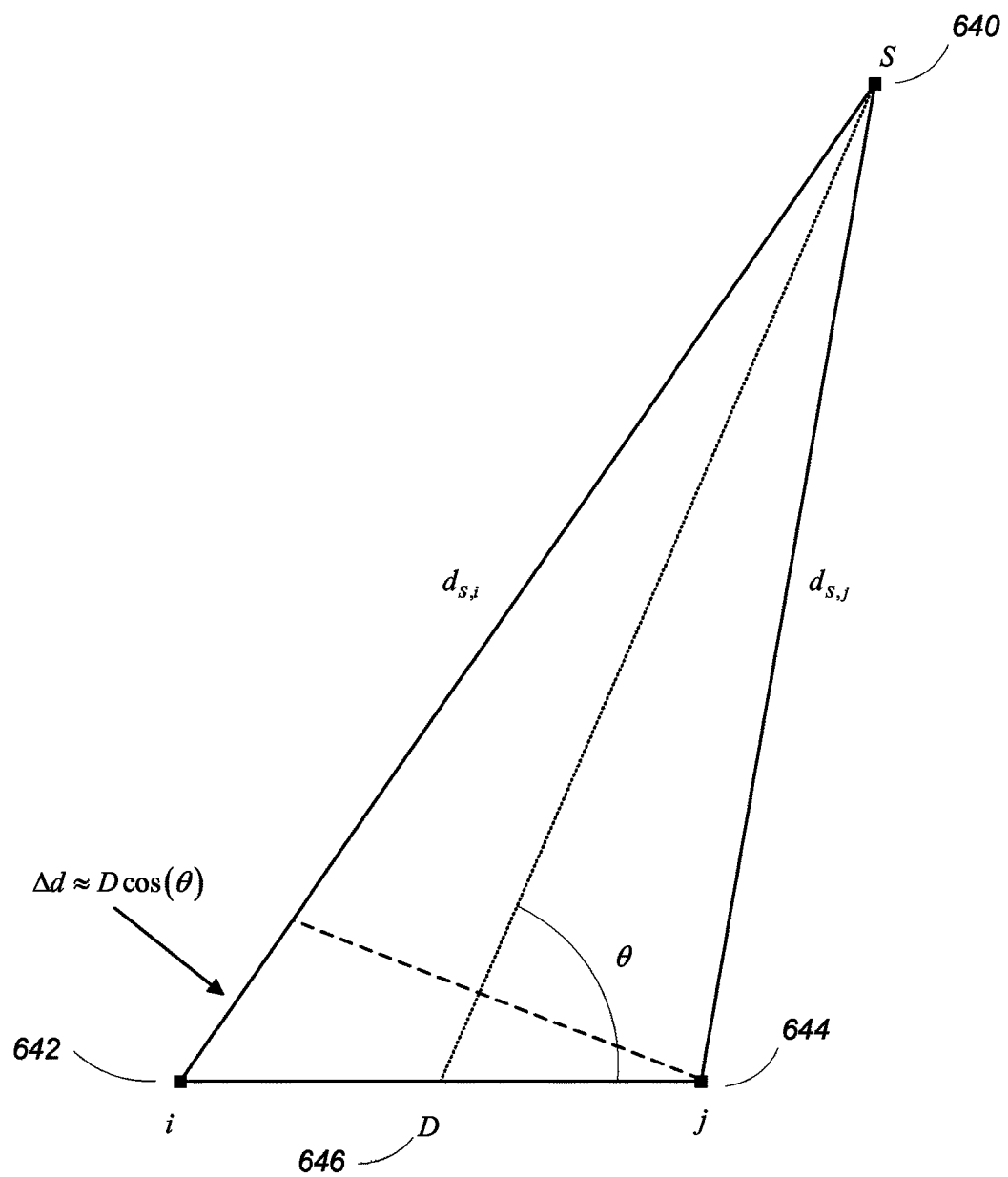
FIG. 3 is a schematic diagram of an antenna configuration that forms a single main lobe.

For example, referring to FIG. 3, an angle of arrival of a signal from a signal source at a position, S 640 at a pair of receive antennas, i 642 and j 644 separated by a distance, D 646 can be computed based on the phase difference between the signal received at antenna i 642 and the signal received at antenna j 644.

In FIG. 3, $d_{S,i}$ and $d_{S,j}$ denote the distances from S 640 to antenna i 642 and antenna j 644 respectively. The phase of the signal received at antenna i 642, $\varphi_i$ is related to $d_{S,i}$ and the wavelength of the signal, $\lambda$ by the following equation:

$$\phi_i = -\text{mod}\left(\frac{2\pi}{\lambda} d_{S,i}, 2\pi\right).$$

The phase of the signal received at antenna j 644, $\varphi_j$ is related to $d_{S,j}$ and the wavelength of the signal, $\lambda$ by the following equation:

$$\phi_j = -\text{mod}\left(\frac{2\pi}{\lambda} d_{S,j}, 2\pi\right).$$

It follows that the phase difference between the received signals at the two antennas 642, 644, $\Delta\varphi_{j,i}=\varphi_j-\varphi_i$ which is related to the difference in the distances of the two antennas from the source, $\Delta d_{i,j}=d_{S,i}-d_{S,j}$ by the following equation:

$$\frac{\Delta d_{i,j}}{\lambda} = \frac{\Delta \phi_{j,i}}{2\pi} + k$$

where k is an integer in the range $$\left(-\frac{D}{\lambda} - \frac{\Delta \phi_{j,i}}{2\pi}, \frac{D}{\lambda} - \frac{\Delta \phi_{j,i}}{2\pi}\right).$$

When S is relatively far from the antennas 642, 644, $\Delta d_{i,j}/\lambda$ can be approximated as $D\cos(\omega)/\lambda$ where $\theta$ is the angle of arrival. Based on this approximation, the above equation can be rewritten as:

$$\frac{D\cos(\theta)}{\lambda} = \frac{\Delta \phi_{j,i}}{2\pi} + k.$$

In the case that D is less than or equal to $\lambda/2$, the value of k in the above equation has only one possible value which is 0 since $\cos(\theta)\in[-1,1]$. For this reason, when $D\leq\lambda/2$, a unique angle of arrival, $$\theta = \arccos\left(\frac{\lambda}{D} \frac{\Delta \phi_{j,i}}{2\pi}\right)$$

can be derived, resulting in a single lobe in the antenna pattern for the pair of antennas by combining the antenna signals according to the phase difference, $\Delta\varphi_{j,i}$.

Figure 4:
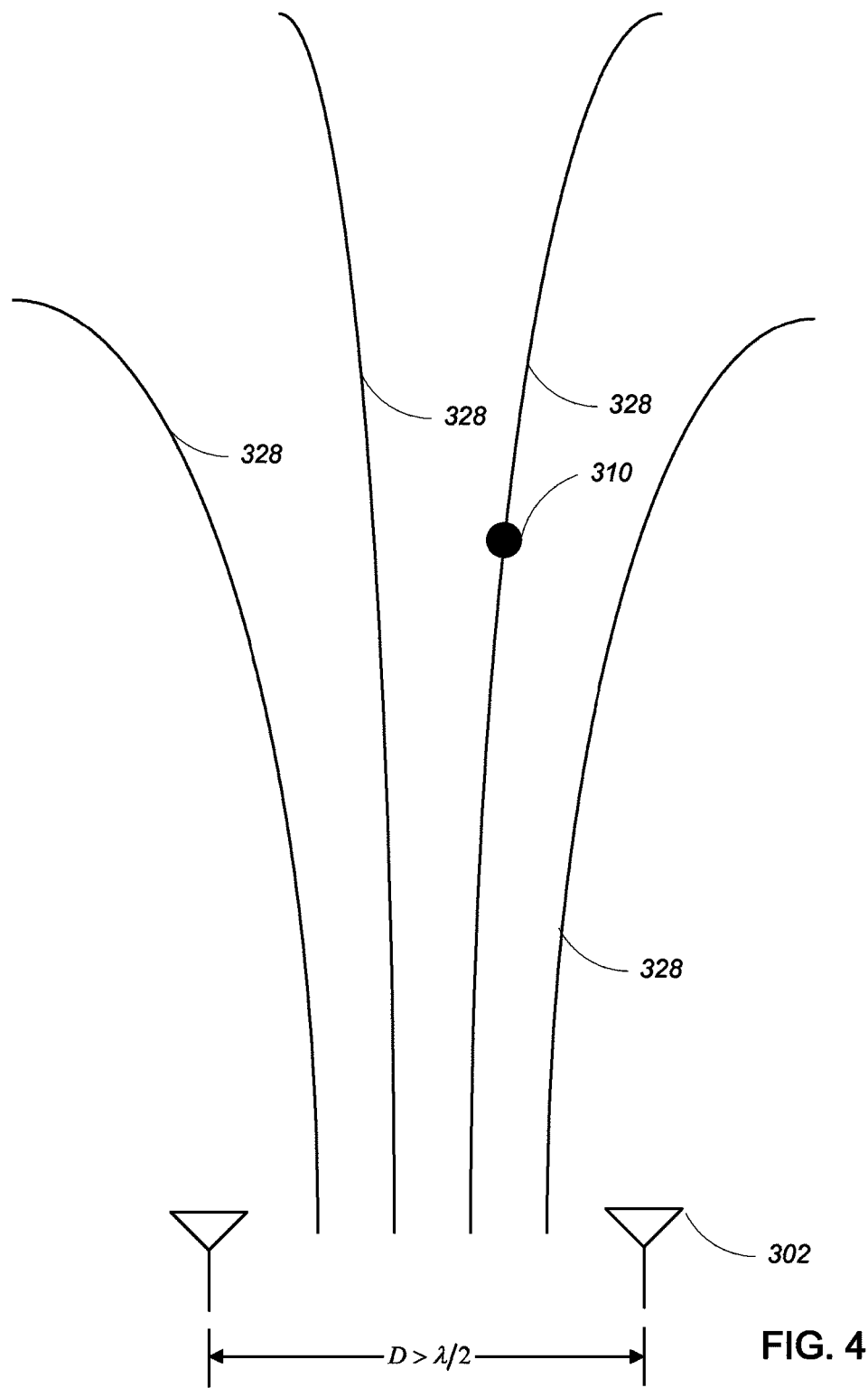
FIG. 4 is a schematic diagram of an antenna configuration that forms fine-grained grating lobes.

Referring to FIG. 4, as a distance, D, between a pair of antennas 302 is increased to exceed $D=\lambda/2$, the number of lobes 328 formed by the pair of antennas 302 increases. At the same time a lobe width of each of the lobes 328 decreases as D increases. The lobes 328 formed by the separated pair of antennas 302 are referred to as "grating lobes."

In particular, as D increases past $\lambda/2$, the number of possible values of k increases (i.e., for $D=k\lambda/2$ the number of possible values for k is K). Hence, there are K different values of $\theta$ that will satisfy $$\theta = \arccos\left(\frac{\lambda}{D} \frac{\Delta \phi_{j,i}}{2\pi} + \frac{k\lambda}{D}\right).$$

Of course, only one of the values of $\theta$ refers to the actual angle of arrival.

The multiple different values of $\theta$ result in the multiple lobes 328 (i.e., grating lobes) in the antenna pair's lobe pattern corresponding to multiple spatial angles. The lobes 328 can be swept as a group to track an RF source 310 by combining the antenna signals with different phases. However, during the tracking it is only known that the RF source 310 is present at some point along a length of one of the lobes 328. There is an ambiguity as to which one of the lobes 328 the RF source 310 is present in.

Figure 5:
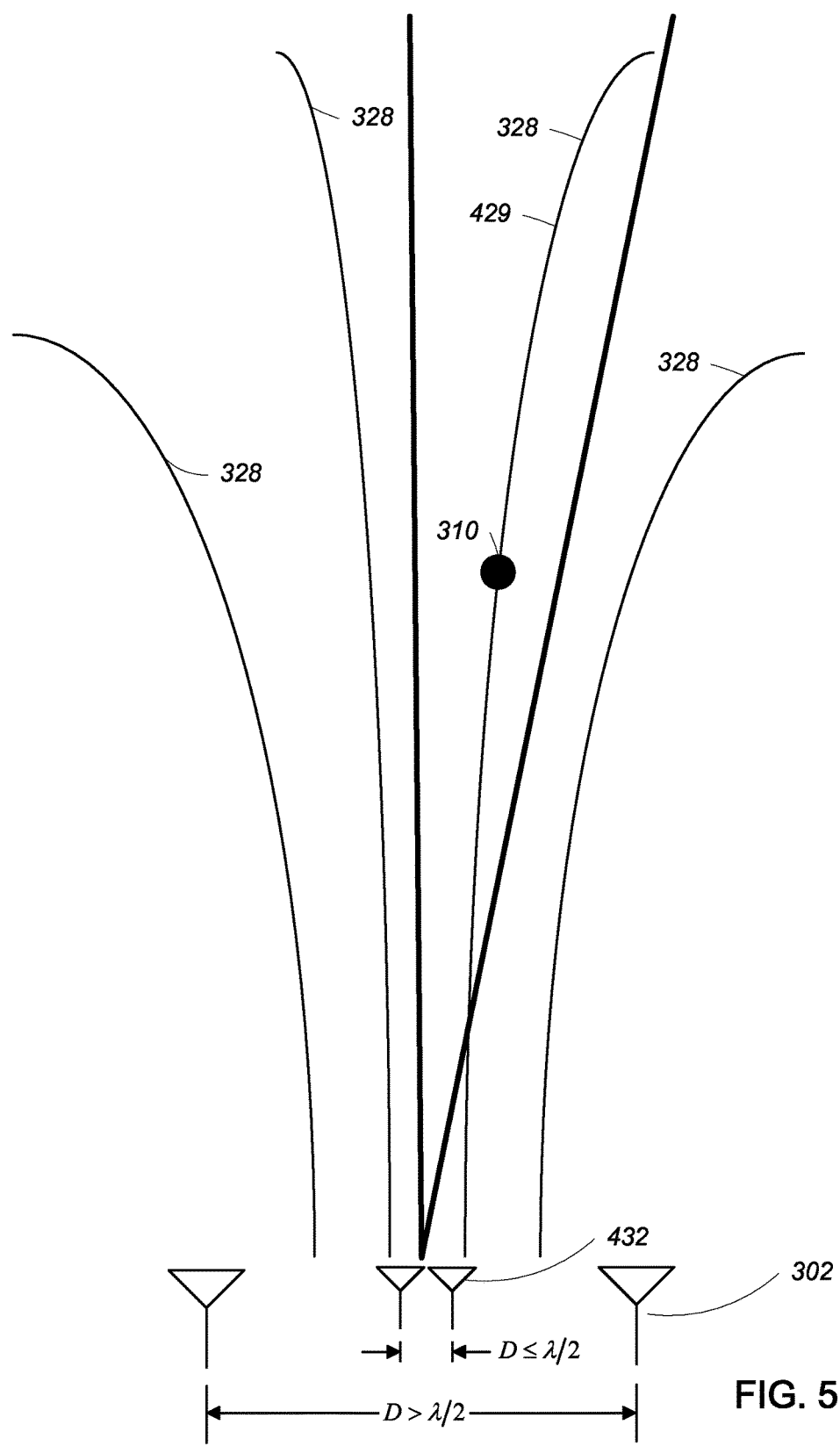
FIG. 5 is a schematic diagram of an antenna configuration that forms grating lobes and a single, coarse-grained lobe.

Referring to FIG. 5, one way of resolving this ambiguity is to include a second pair of antennas 432 which are separated by a distance, D, that does not exceed D=λ/2. The second pair of antennas 432 forms a single, lower resolution lobe 430 which provides a coarse tracking of the RF source 310. The lower resolution lobe 430 acts as a coarse spatial filter which resolves or at least reduces the ambiguity as to which of the lobes 328 is the lobe corresponding to the location of the RF source 310. In FIG. 4, the lower resolution lobe 430 has tracked the RF source 310 to a coarse-grained area in which a specific fine-grained lobe 429 of the lobes 328 is also present. This is an indication that the RF source 310 is present at a location along a length of the specific lobe 429 and is not located along a length of any of the other lobes 328. In this way, the above-described ambiguity is resolved.

1.2 High Resolution Tracking

Referring again to FIG. 2, in some examples, the configuration of FIG. 4 may not provide sufficient information for determining the location of the RF source since it is only known that the RF source is located at some point along a length of one of the lobes. Indeed, there is no way of knowing where along the length of the lobe the RF source is located. For this reason, in FIG. 2, the set of antennas 214 includes four antennas 214a-d, each placed at a different corner of a square and separated by a distance greater than λ/2 (e.g., 8λ×8λ).

When the high resolution tracking module 216 tracks an RF source 210, the four antennas 214a-d form a total of 6 pairs, each pair forming its own set of grating lobes (or lobes). The high resolution tracking module 216 tracks the location of the RF source 210 for each of the six pairs of antennas by sweeping the grating lobes of each pair of antennas. The high resolution tracking module 216 outputs the fine-grained but ambiguous tracking result 222 which includes a number of fine-grained candidate locations 223 for the RF source 210, each candidate location 223 being at an intersection of two or more different grating lobes. To simplify the figure, only the candidate locations 223 for the RF source 210 at the intersections of the grating lobes for the 6 pairs of antennas are shown (as dots) in the fine-grained but ambiguous tracking result 222. In the fine-grained but ambiguous tracking result 222, it is known that one of the intersection points 223 matches the actual location of the RF source 210. However, which of the intersection points 223 matches the actual location of the RF source 210 is unknown.

In some examples, to track the location of the RF source 201, for each pair of antennas controlled by the high resolution tracking module 216, the high resolution tracking module 216 sweeps the grating lobes of the pair of antennas by adapting the phase difference, $\Delta \varphi_{j,i}$ between the received signals at the antennas such that a maximum received magnitude is maintained.

1.3 Low Resolution Tracking

The antenna configuration includes a second set of antenna pairs 214e, 214f and 214g, 214h with the individual antennas of each pair spaced at a distance, D≤λ/2. Each pair of antennas of the second set of antenna pairs forms a unique low resolution lobe 236, 238. As the unique low resolution lobes 236,238 track the RF source 210, they will intersect and define an unambiguous coarse-grained area 234 in which the RF source 210 is present. The unambiguous coarse-grained area 234 is included in the coarse-grained and unambiguous tracking result 224 generated by the low resolution tracking module 218.

In some examples, to track the location of the RF source 201, for each pair of antennas controlled by the low resolution tracking module 218, the low resolution tracking module 218 sweeps the low resolution lobe of the pair of antennas by adapting the phase difference, $\Delta \varphi_{j,i}$ between the received signals at the antennas such that a maximum received magnitude is maintained.

1.4 Ambiguity Resolution

The coarse grained and unambiguous tracking result 224 and the fine-grained but ambiguous tracking result 222 are provided to the ambiguity resolution module 220 which combines the two results 222, 224 to determine the fine-grained and unambiguous location 227 of the RF source 210. In some examples, the ambiguity resolution module 220 determines the fine-grained and unambiguous location 226 of the RF source 210 by identifying an intersection point (which represents a fine-grained candidate location 223 for the RF source 210) in the fine-grained but ambiguous tracking result 222 which is within the unambiguous coarse-grained area 234 included in the coarse grained and unambiguous tracking result 224. That is, the coarse-grained and unambiguous tracking result 224 is essentially used to spatially filter the fine-grained but ambiguous tracking results 222.

In this way, high resolution grating lobes and coarse spatial filtering can be used to determine a highly accurate location of an RF source.

In some examples, the ambiguity resolution module uses a two-stage voting algorithm to identify the position of the RF source. For example, in a first stage, each antenna pair with a small separation casts one vote on each point in space, based on its belief that the RF source is at that position. The points with high scores after the first stage form a candidate region for use in a second stage. In the second stage, each antenna pair with a large separation casts one vote on each point within the candidate region, based on its belief that the RF source is at that position. The higher the number of votes received for a given point, the greater the likelihood that the given point is the actual position of the RF source.

In some examples, in the first stage, each vote cast by an antenna pair with a small separation is assigned a value that is less than or equal to 0. When the RF source is located in the center of the lobe of the antenna pair, the value of the vote is 0 and as the location of the RF source moves away from the center of the lobe of the antenna pair, the value of the vote becomes more negative. In some examples the value of a vote for an antenna pair with a small separation (i.e., D≤λ/2) is expressed as:

$$V_{i,j}(P) = -\left\|\frac{\Delta d_{i,j}}{\lambda} - \frac{\Delta \phi_{j,i}}{2\pi}\right\|^2.$$

In the second stage, each vote cast by an antenna pair with is also assigned a value that is less than or equal to 0. However, in this case, instead of voting based on how far the RF source is from the center of a single lobe, the vote is based on how far the RF source is from the center of the grating lobe closest to the RF source. In some examples, the value of a vote for an antenna pair with a large separation (i.e., D>λ/2) is expressed as:

$$V_{i,j}(P) = -\min_{k}\left\|\frac{\Delta d_{i,j}}{\lambda} - \frac{\Delta \phi_{j,i}}{2\pi} - k\right\|^2$$

where the minimization over captures the distance to the closest grating lobe among all k grating lobes.

With the votes from all of the antenna pairs cast, all of the votes for at each position, P are summed as follows:

$$V(P) = \Sigma_{i,j} V_{i,j}(P).$$

The position with the highest total vote, V(P) is the most likely position of the RF source.

2 Trajectory Tracing Using Multi-Resolution Positioning

For some applications, rather than simply determining a location of a static device as is described above, it is desirable to track a trajectory (e.g., relative motion through space) of an RF source as it moves to determine its shape. Some examples of applications where trajectory tracking is useful are gaming, smart phones, and healthcare.

Figure 6:
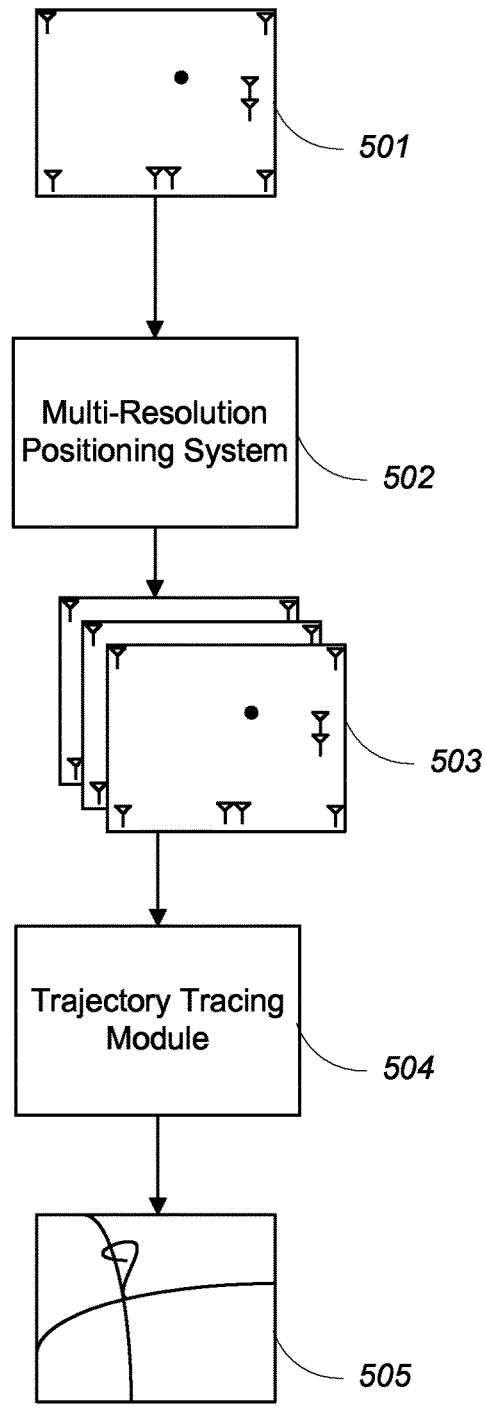
FIG. 6 is a schematic diagram of a trajectory tracing system.

Referring to FIG. 6, a system 500 for reconstructing a trajectory of a moving RF source includes a multi-resolution positioning system 502 such as the system described above and a trajectory tracing module 504. Very generally, the multi-resolution positioning system 502 generates a time series 503 of sets of candidate fine-grained locations of an RF source. In some examples, each of the candidate fine-grained locations of the RF source in the time series 503 includes a single candidate location which is associated with the highest total vote, V(P). In other examples, each of the candidate fine-grained locations of the RF source in the time series 503 includes a number, N of fine-grained locations which are associated with the N locations with the highest total votes, V(P).

The time series 503 is provided to the trajectory-tracing module 504 which identifies the grating lobes associated with each of the candidate fine-grained locations of the RF source. Throughout the progression of the time series 503, the trajectory-tracing module 504 estimates the trajectories of the grating lobes for each of the candidate fine-grained locations of the RF source. At the end of the time series 503 the estimated trajectories for each of the candidate fine-grained locations of the RF source are compared and the best trajectory (as determined by some measure such as the voting scheme described above) is selected as the final output trajectory 505.

In some examples, the final output trajectory shape can be provided to a handwriting recognition algorithm which recognizes characters represented by the trajectory. In other examples, the trajectory can be provided to a gesture recognition algorithm which recognizes gestures represented by the trajectory. In some examples, the final output trajectory can be interpreted as commands which can be used as input to a computing device.

In some examples, the approaches described above can be used to implement a computer input device such as a virtual touch screen. In such a virtual touch screen application, any spatial plane or surface can be used as a touch screen.

In other examples, the approaches described above can be used to control appliances and devices (e.g., televisions) in settings such as the home, the car, or in an enterprise setting. In some examples, the approaches described above can be used in business analytics applications for stores and supply chains to track humans, robots, or other objects of interest. In some examples, the approaches described above can be used to track seniors for safety purposes.

In some examples, the approaches described above can be used to track motion for use in video game applications, healthcare applications, film production applications, manufacturing process applications, entertainment applications, energy applications, and smart home applications.

In some examples, the approaches described above can be used in a localized heating system for energy conservation purposes. For example, recent developments in heating technology allow for heat to be delivered toward a particular location in space by focusing heating lenses toward that location. In this way, rather than heating an entire environment, heat is efficiently focused on where humans are in the environment. The approaches described above can be used by such a heating system to track humans in the environment in real time with high accuracy and high reliability.

The approaches described above can be used to locate and track any type of radio frequency signal, including but not limited to signals from RFIDs, WiFi signals, Bluetooth signals, and so on.

It is noted that, while the above examples generally describe localization and tracking in a two-dimensional plane, the approaches described can readily be extended to a three-dimensional system. For example, the antennas are disposed in non-planar configurations.

3 Implementations

Various implementations of the approaches described above can be used. For example, systems that implement the techniques described above can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). One or more modules may be implemented using one or more programmed or software controlled processors or using electronic circuitry.

It is to be understood that the foregoing description is intended to illustrate and not to limit the scope of the invention, which is defined by the scope of the appended claims Other embodiments are within the scope of the following claims.

What is claimed is:

1. A system for localization of a radio frequency source in a region comprising:
   a first plurality of antennas disposed about the region, the first plurality of antennas including two or more pairs of antennas, the antennas of each of the two or more pairs of antennas being separated by a distance of greater than one half of a wavelength of a radio frequency signal emitted from the radio frequency source, a first pair of antennas of the two or more pairs of antennas being associated with a first receiving pattern with a first plurality of grating lobes and a second pair of antennas of the two or more pairs of antennas being associated with a second receiving pattern with a second plurality of grating lobes;
   a second plurality of antennas disposed about the region;
   a first radio frequency positioning module in communication with the first plurality of antennas and configured to determine a plurality of spatially separated candidate locations in the region for the radio frequency source, at least some candidate locations of the plurality of spatially separated candidate locations being located at intersections of grating lobes of the first plurality of grating lobes and grating lobes of the second plurality of grating lobes;
   a second radio frequency positioning module in communication with the second plurality of antennas and configured to determine a sub-region of the region, the sub-region including the radio frequency source; and
   a resolution module for receiving the determined plurality of spatially separated candidate locations and the determined sub-region and for identifying a subset of the candidate locations in the sub-region of the region.

2. The system of claim 1 wherein the resolution module is configured to determine an actual location of the radio frequency source in the region from the identified subset of the candidate locations in the sub-region of the region.

3. The system of claim 2 wherein the resolution module is configured to apply a voting algorithm to the plurality of spatially separated candidate locations to determine the actual location of the radio frequency source.

4. The system of claim 1 further comprising a tracking module for accepting time successive candidate locations from the resolution module and determining a trajectory of the radio frequency source based on the time successive candidate locations.

5. The system of claim 1 wherein a receiving antenna pattern of each of the two or more pairs of antennas includes a plurality of lobes.

6. The system of claim 5 wherein each spatially separated candidate location of the plurality of spatially separated candidate locations is located at an intersection of lobes from two or more of the two or more pairs of antennas.

7. The system of claim 6 wherein the first radio frequency positioning module is configured to sweep the receiving antenna pattern of each of the two or more pairs of antennas such that one of the lobes of the antenna pattern of the pair of antennas tracks a position of the radio frequency source.

8. The system of claim 1 wherein the second plurality of antennas includes two or more pairs of antennas, the antennas of each of the two or more pairs of antennas being separated by a distance of less than or equal to one half of a wavelength of a radio frequency signal emitted from the radio frequency source.

9. The system of claim 8 wherein a receiving antenna pattern of each of the two or more pairs of antennas includes a main lobe and a plurality of side lobes, a sensitivity of the main lobe being greater than a sensitivity of any one of the side lobes.

10. The system of claim 9 wherein the second radio frequency positioning module is configured to sweep the receiving antenna pattern of each of the two or more pairs of antennas such that the main lobe of the antenna pattern pair of antennas tracks a position of the radio frequency source.

11. The system of claim 1 wherein the first plurality of antennas is distinct from the second plurality of antennas.

12. The system of claim 1 wherein one or more of the first radio frequency positioning module, the second radio frequency positioning module, and the resolution module are implemented in a software controlled processor.

13. The system of claim 1 wherein each of at least some pairs of antennas of the two or more pairs of antennas are configured as a phased antenna array.

* * * * *